May 25, 1954   B. A. WIDELL ET AL   2,679,624
DYNAMOELECTRIC MACHINE
Filed May 2, 1952
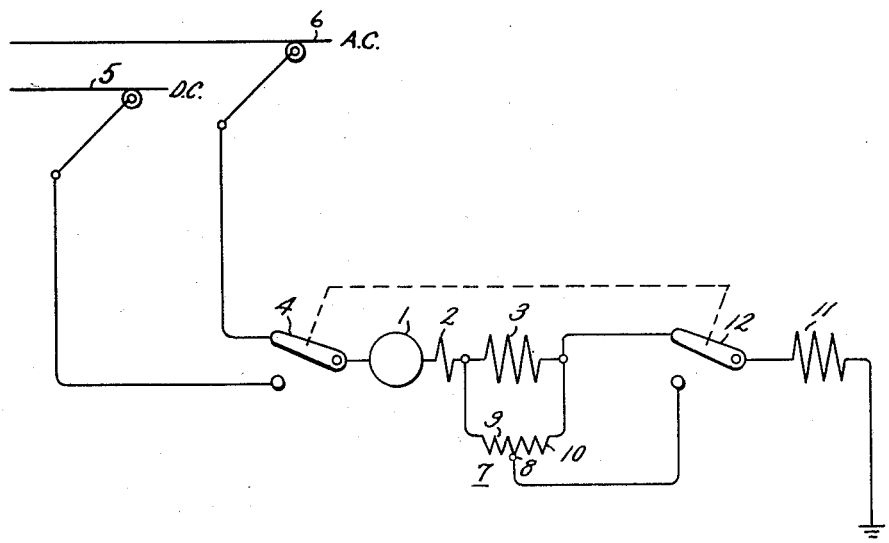
Inventors:
Berndt A. Widell,
Harold S. Ogden,
by Burrell P. Mack
Their Attorney.

Patented May 25, 1954

2,679,624

UNITED STATES PATENT OFFICE 2,679,624

DYNAMOELECTRIC MACHINE

Berndt A. Widell and Harold S. Ogden, Erie, Pa., assignors to General Electric Company, a corporation of New York Application May 2, 1952, Serial No. 285,638

7 Claims. (Cl. 318—245)

This invention relates to dynamoelectric machines and more particularly to series commutator type machines adapted to be operated on either alternating current or direct current.

In certain applications, such as in straight electric locomotives, series commutator type motors are required to operate from both alternating current and direct current, for example when the locomotive must be operated from both alternating current and direct current trolley wires and further, even though the locomotive is operated from an alternating current trolley only, there may be a requirement that the motors generate direct current for dynamic braking. For alternating operation, a surplus number of turns may be wound on the interpole of the motor to provide the desired lowest speed of best commutation with the interpole winding being shunted by a non-inductive resistor. However, when a motor so wound is to be operated on direct current, by reason of the surplus number of turns on the interpole, the interpole winding must be shunted to a differest degree to obtain acceptable commutation. Because of the variations in ambient temperature and the copper temperatures normally encountered in the interpole winding, some form of desensitizing circuit is required in order to maintain the percentage of current shunted around the interpole winding at a nearly constant value. It has been found that for direct current operation, a resistor can be arranged in series with the interpole winding having a substantially greater resistance than the hot resistance of the interpole winding and the interpole circuit including the interpole winding and the series resistance is shunted with another resistor to give the required amount of shunting at normal operating temperatures. Using resistor material with a relatively low temperature coefficient of resistance for these resistors, any change in resistance of the interpole winding due to temperature will have little or no effect on the current distribution between the interpole winding and the shunting resistor and thus the commutation characteristics set up by the interpole will remain substantially constant. It is, therefore, desirable to provide a simple circuit in which both series and shunting resistors are provided for direct current operation and a shunting resistor only for alternating current operation of the motor.

An object of this invention is therefore to provide an improved series commutator type motor circuit incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a commutator type dynamoelectric machine is provided having an interpole winding with a resistance connected thereacross. This resistance has a tap dividing the resistance into two sections and a switch is provided arranged selectively to connect a source of voltage either directly to the interpole winding for operating the machine on alternating current or to the resistance tap for direct current operation. More specifically, the resistance connected in parallel with the interpole winding is a low temperature co-efficient resistance with the section connected to the end of the interpole winding remote from the armature of the machine having a resistance substantially greater than the hot resistance of the interpole winding. When the switch connects the interpole winding directly to the source of voltage, the entire resistance is shunted across the interpole winding while connecting the resistance tap to the source of voltage rearranges the circuit so that the resistance section connected to the end of the interpole winding remote from the armature of the machine is arranged in series with the interpole winding while the other resistance section is connected in parallel with the serially connected elements. Another switch may be provided arranged selectively to connect the motor circuit either to a source of alternating current or to a source of direct current. The series main field exciting winding is also serially connected to the motor circuit.

The single figure of the drawing schematically illustrates the improved series motor circuit of this invention.

Referring now to the drawing there is shown a commutator type traction motor having an armature 1 with exciting pole face winding 2 and interpole winding 3 being connected in series therewith. A two-position switch 4 is arranged selectively to connect the armature 1 either to direct current trolley wire 5 or to alternating current trolley wire 6. A low temperature coefficient resistance 7, formed for example from constantan, a copper-nickel alloy, is connected across interpole winding 3 and is provided with a tap 8 which divides the resistance into sections 9 and 10. The section 10 connected to the end of the interpole winding 3 remote from the armature 1 is arranged to have substantially greater resistance than the hot resistance of the interpole winding, for example 5 to 6 times the hot resistance of the interpole winding 3. The remaining section 9 of the resistance 7 is proportioned so that it operates over substantially the same temperature range as the section 10 during direct current operation. A main series field exciting winding 11 is provided for the motor having one end connected to the other side of the source of power selected, as for example in the case of a locomotive to the ground return circuit through the rails, and its other end is connected to another two-position switch 12. The switch 12, which may be suitably ganged with the switch 4, selectively connects the series field exciting winding 11 either directly to the interpole winding 3 for operating the motor from alternating current, or to the tap 8 for operating the motor from direct current.

It will be readily seen that with the switch 4 connecting armature 1 to alternating current trolley wire 6 and with switch 12 connecting series field exciting winding 11 directly to interpole winding 3, the entire shunting resistance 7 is connected in parallel with the interpole winding 3. When, however, the switch 4 connects the armature 1 to direct current trolley wire 5, and switch 12 connects the series field winding 11 to tap 8, it will be seen that the resistance section 10 of shunting resistance 7 is arranged in series with the interpole winding 3 while the section 9 is in parallel with the serially connected interpole winding 3 and resistance section 10. It will thus be readily seen that by virtue of the relatively high resistance of the shunting resistance 7 and its relatively low temperature coefficient, a substantial change in the internal resistance of interpole winding 3 by virtue of temperature changes will not materially affect the overall resistance of the circuit so that the percentage of total current flowing through the interpole winding 3 remains substantially constant. The tap 8 is selected to give the desired shunting on direct current operation and it has been found that the inherent temperature compensation of the resultant circuit is acceptable over a wide range of temperature. While the term "interpole winding" is used herein, this winding is also referred to as a "commutating field winding." In addition, in place of a low temperature coefficient material for the resistor, a resistor having a low temperature operating range may be employed. The important element is that the actual resistance change be kept to a very small value.

It will now be readily seen that this improved circuit provides inherent compensation over a wide range of temperature variations in the interpole field circuit when the motor is operated on direct current. This arrangement also provides a simple arrangement for changing the interpole compensation required for operation on alternating current or direct current. Finally, the circuit utilizes a standard alternating current interpole shunting resistor with the switch 12 being the only additional element needed to provide the necessary compensation for direct current operation.

While we have shown a particular embodiment of this invention, further modifications and improvements will occur to those skilled in the art. For example, series field winding 11 may be serially connected at any point in the circuit and further, in case the motor is to be connected for dynamic braking, other switch means may be provided to connect the circuit across the braking resistance. We desire it to be understood, therefore, that this invention is not limited to the form shown and we intend in the appended claims to cover all modifications which do not depart from the spirit and scope of this invention.

What we claim as new and desire to secure by Letters Patent of the United States is:

1. A circuit for a commutator type dynamo-electric machine having an interpole winding and comprising a resistance connected across said interpole winding and having a tap dividing said resistance into two sections, and switch means arranged selectively to connect a source of voltage directly to said interpole winding for operating said machine on alternating current or to said resistance tap for operating said machine on direct current.

2. A circuit for a commutator type dynamo-electric machine having an interpole winding and comprising a resistance connected in parallel with said interpole winding and having a tap dividing said resistance into two sections, first switch means arranged selectively to connect said circuit to a source of alternating current or a source of direct current, and second switch means arranged selectively to connect the source of voltage selected by said first switch means directly to said interpole winding for operating said machine on alternating current or to said resistance tap for operating said machine on direct current.

3. A circuit for a series commutator type dynamoelectric machine having an interpole winding with one end thereof connected in series with the armature of said machine and comprising a low temperature coefficient resistor connected in parallel with said interpole winding and having a tap dividing said resistance into two sections, and a switch arranged selectively to connect the other end of said interpole winding in said circuit whereby all of said resistance is arranged in parallel with said interpole winding for operating said machine on alternating current or to connect said resistance tap in said circuit whereby one section of said resistance is arranged in series with said interpole winding and the other section thereof is arranged across said serially connected interpole winding and said one resistance section for operating said machine on direct current.

4. A circuit for a series commutator type dynamoelectric machine having an interpole winding with one end thereof connected in series with the armature of said machine and comprising a low temperature coefficient resistance connected in parallel with said interpole winding and having a tap dividing said resistance into two sections, a first switch arranged selectively to connect the other end of said interpole winding in said circuit whereby all of said resistance is arranged in parallel with said interpole winding for operating said machine on alternating current or to connect said resistance tap in said circuit whereby one section of said resistance is arranged in series with said interpole winding and the other section thereof is arranged across said serially connected interpole winding and said one resistance section for operating said machine on direct current, and a second switch arranged selectively to connect said circuit to a source of alternating current or to a source of direct current.

5. A circuit for a series commutator type dynamoelectric machine having an interpole winding with one end thereof connected in series with the armature of said machine and comprising a low temperature coefficient resistance connected across said interpole winding and having a tap dividing said resistance into two sections, the one section of said resistance connected to the other end of said interpole winding having a resistance substantially greater than the hot resistance of said interpole winding, and a switch arranged selectively to connect the other end of said interpole winding in said circuit whereby all of said resistance is arranged in parallel with said interpole winding for operating said machine on alternating current or to connect said resistance tap in said circuit whereby said one section of said resistance is arranged in series with said interpole winding and the other section thereof is arranged across said serially connected interpole winding and said one resistance section for operating said machine on direct current.

6. A circuit for a series commutator type dynamoelectric machine having an interpole winding with one end thereof connected in series with the armature of said machine and comprising a low temperature coefficient resistance connected across said interpole winding and having a tap dividing said resistance into two sections, the one section of said resistance connected to the other end of said interpole winding having a resistance substantially greater than the hot resistance of said interpole winding, a first switch arranged selectively to connect the other end of said interpole winding in said circuit whereby all of said resistance is arranged in parallel with said interpole winding for operating said machine on alternating current or to connect said resistance tap in said circuit whereby said one section of said resistance is arranged in series with said interpole winding and the other section thereof is arranged across said serially connected interpole winding and said one resistance section for operating said machine on direct current, and a second switch arranged selectively to connect said circuit to a source of alternating current or to a source of direct current.

7. A circuit for a series commutator type dynamoelectric machine having an interpole winding with one end thereof connected in series with the armature of said machine and comprising a low temperature coefficient resistance connected across said interpole winding and having a tap dividing said resistance into two sections, the one section of said resistance connected to the other end of said interpole winding having a resistance substantially greater than the hot resistance of said interpole winding, a first switch arranged selectively to connect the other end of said interpole winding in said circuit whereby all of said resistance is arranged in parallel with said interpole winding for operating said machine on alternating current or to connect said resistance tap in said circuit whereby said one section of said resistance is arranged in series with said interpole winding and the other section thereof is arranged across said serially connected interpole winding and said one resistance section for operating said machine on direct current, a second switch arranged selectively to connect said circuit to a source of alternating current or to a source of direct current, and a main field winding serially connected in said circuit.

References Cited in the file of this patent

UNITED STATES PATENTS

| Number | Name | Date |
|---|---|---|
| 794,363 | Lamme | July 11, 1905 |
| 1,103,693 | Shedd | July 14, 1914 |